Oct. 16, 1956      S. GAYMONT      2,767,118
METHOD OF BACTERIAL INCUBATION CONTROL AND
APPARATUS THEREFOR
Filed Oct. 28, 1952
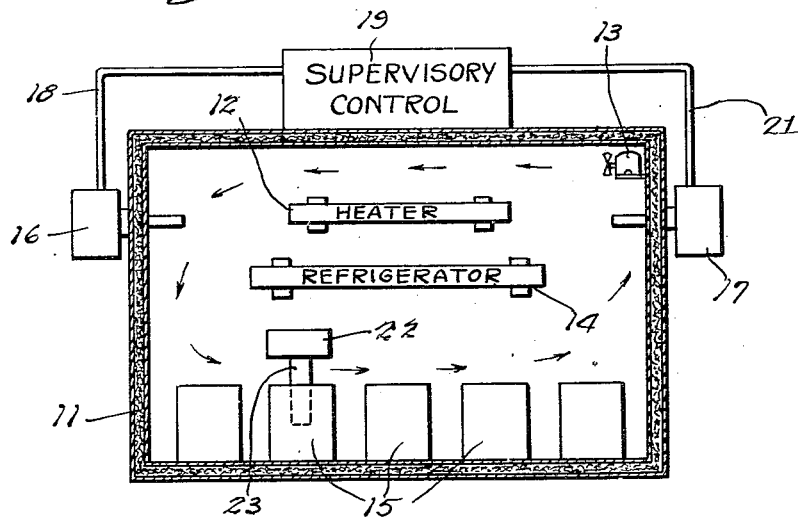
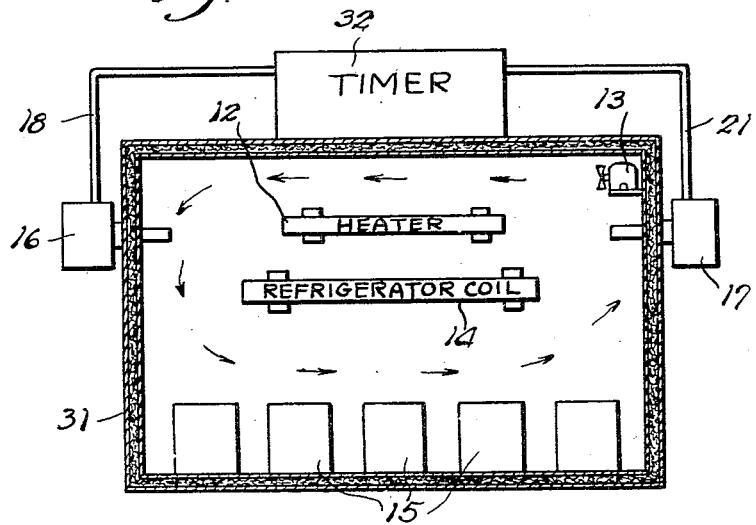
INVENTOR.
Stephen Gaymont
BY
B. Gordon Allen United States Patent Office 2,767,118
Patented Oct. 16, 1956

2,767,118

METHOD OF BACTERIAL INCUBATION CONTROL AND APPARATUS THEREFOR

Stephen Gaymont, Evanston, Ill.

Application October 28, 1952, Serial No. 317,259

1 Claim. (Cl. 195—96)

The present invention relates to bacterial incubation systems and concerns itself more particularly with productivity control of bacteriological cellular growth under predetermined or adjustable regulation so that the rate of cellular fission is arrested following an incubation period under conditions which produce maximum bacterial concentrations or optimum bacterial viability.

Various species of bacteria are utilized industrially for the purpose of producing desired qualities in food production. Dairying, baking, and brewing are among the more generally known examples in which bacterial cultures are consumed for the purpose of producing biochemical change. In other instances the bacterial cultures are developed for direct human consumption, as, for example, in the cases of yogurt, acidophilus milk, or similar products. Some of the processes involving bacterial cultures are enzymic in nature and others are simple fermentations. However, the efficiency of these processes is in nearly all instances dependent upon the even diffusion and viability of the bacterial cultures so that for achieving a fair measure of predictable results, it is important that the ingredient cultures supported in their nutrient culture media be virile and well distributed.

Reproductivity control over these classes of useful bacteria has been practiced heretofore by means of various environmental regulation. Different control factors are known to have variously responsive effects, and together these effects exercise a complex influence upon their growth. Temperature and nutrition are chief control factors, and through the regulation thereof, bacterial processes have been regulated in fairly predictable measure. Also, through these control channels batch colonies have been made with such constant and uniform results that they may be employed forthwith in the compounding and formulation of food substances with consistent effects and under close tolerance conditions.

In order to reproduce bacteria cultures with maximum efficiency respecting time and thoroughness of cultivation, each species requires to be treated under a set of conditions most favorable to it, and when exposed to its particular ideal temperature range and culture media, productivity may be calculated with but insignificant deviation. Unit charges of culture nutrient are placed into a temperature and humidity controlled space and reproductivity is permitted to develop at maximum rate until a condition is reached where the consumable nutrient material is balanced by the bacterial accumulation, so that any further increase in culture bacteria encounters nutritional shortage. Upon reaching this optimum condition, reproduction is suspended by impressing upon the incubation environment a temperature change preferably in the cooling direction, whereupon a retardation of cellular growth becomes effected without actually killing the bacteria or diminishing its viable potential.

The nutrient media for nearly all species of bacteria is made most favorable for rapid development when presented in liquid or gel form. Colonization for commercial purposes is advantageously carried on within relatively small portable vessels that subsequently serve the purpose of shipment containers. Also, the use of such containers permits better uniformity in the bacterial distribution throughout the nutrient mass so that observations or testings made upon one unit or vessel may be expected to manifest the condition which is prevalent throughout the other units.

Reproductivity and cellular growth is attended by certain side-product results; for example, accumulation of secretion and waste of different characteristics, depending upon the nature of the nutrient and species of bacteria. This effect is a proportional factor and may therefore be utilized as an index of culture growth attainment. Prevalently, bacteria excrete an acid side-product so that measurement of its solution acidity or pH index may be utilized to determine relative concentration. Such observations are made by immersing into the fluid electrode terminals of a known potential, and by registering the ionization characteristics of the solution as a resistance variable in a reading circuit. By calibrating the resistance variable the pH radical can be related and used to indicate any desired goal attainment. Also, this condition can be calculated from precedent practice and the growth attainment of cultures controlled by timing regulation.

Both of these practices contemplate operational procedures which may extend over several hours of duration and in instances span more than a working-day period even under ideal laboratory conditions. The overseeing task with regard to bacterial incubation is therefore tedious and inimical to human patience. Failure to invoke the proper growth control over batch charges invariably results in total loss, particularly when the charges are overdeveloped. Where the viability of the bacterial colony is important toward the success of subsequent processing, the arrestment of bacterial growth at optimum conditions is essential.

A principal object of the present invention, therefore, is to provide an incubation system and apparatus for the automatic supervision of bacterial cultures which will assure growth arrestment of cellular fission upon the attainment of predetermined cultural concentrations.

Another object of the invention is to provide a cultural development chamber for bacterial incubation which will maintain the growth development heat level for an adjustable period of time and then will automatically invoke a growth-arresting temperature drop for preserving cultural batches at their optimum viability.

Yet another object of the present invention is to automatically process bacterial cultures contained in unit receptacles filled with fluid nutrient material beginning with inoculation and extending through maximum cellular growth concentration whereupon to automatically arrest further productivity by depressing the environmental temperature below growth-supporting level.

A further object of the invention is to control an incubation chamber with the heating and cooling apparatus under the supervision of a bacterial residue-sensing device so that an incubation environment is maintained for an initial period until a residual manifestation is achieved, whereafter a suspension environment is produced for preserving treated cultures at optimum viability.

For a better understanding of this invention reference will now be had to the following detailed description taken in conjunction with the accompanying illustration, of which Fig. 1 is a schematic sectional view through a combined incubator-refrigerator housing unit whose productivity cycle is regulated by an immersion type of supervisory control and of which Fig. 2 is a schematic view of a related system in which the productivity cycle is regulated by timer supervision.

An incubator cabinet 11 preferably constructed so as to be accessible from a forward direction is constructed with efficient heat-insulating wall elements as well as with an adjacent refrigerating coil operating system. Within the enclosure a heating element 12 is disposed at an upper level with sufficient space thereabove to permit a circuitous and agitating air current to be directed as through the use of a small circulating fan 13. This provision is to assure a throughout uniformity in temperature at any level.

Immediately beneath electric heater there may be supported a horizontal refrigeration coil 14 having sufficient exchange surface to enable the cooling system to depress the temperature at an average rate of from 4 to 6 degrees per minute from the incubation level to the arrestment level.

The bottom of the cabinet may accommodate an arrangement of receptacles or wide-mouth jars 15 within each one of which there has been placed a measured volume of fluid nutrient within which there has been impressed preferably in a centralmost region a bacterial inoculation from a mother culture. If desired, the cabinet may include horizontal shelving adequately perforated so as not to interfere with circulation and preferably with the receptacles or jars 15 positioned thereon with marginal spacing from each other to further augment thorough circulation.

At an intermediate level there extends into the cabinet the sensory tube of one of more thermostatic supervisory devices 16 and 17 for regulating temperature control.

The device designated 16 represents supervision over the heater 12 and includes a circuit-controlling contact pair which will maintain an energizing condition until an incubation temperature level is attained within the cabinet. Circuit 18 of device 16 passes through the supervisory master panel 19 before reaching the heater-energizing circuit for stimulating the electric heating element 12.

The thermostatic device 17 in like manner contains a contact pair which may be adjusted to close except when the prevailing temperature within the cabinet is below the bacterial growth-arresting level and thereupon complete a circuit 21 which also extends into the supervisory control cabinet 19 before reaching the energizing stimulus for the refrigeration coil 14.

Whether thermostat 16 or 17 is to be effective is, therefore, a determination which is made within the supervisory control unit 19 through any of various modes of selection. In the embodiment featured in Fig. 1 an immersion sensory device 22 is shown extending into one of the receptacles 15 for the purpose of obtaining an ionization index. This device includes a tube 23 which contains spaced electrodes. As the growth of the culture increases, there will result an accumulation of side-product waste which for certain bacterial species manifests a proportional pH index. By setting the immersion device 22 to be responsive to a predetermined current flow in a test circuit including the electrode elements of prod 23, a responsive relay is made indicating the attainment of a predetermined state. This relay then switches an alternative controller in the supervisory panel 19, disabling the thermostat 16, and simultaneously conditioning thermostat 17 to take over.

Accordingly, the disclosure and system contemplated in the foregoing described plan of operation is one which measures attainment by a typical index in one of the cultures. This system is more favorable to bacteriological growth species whose rate of productivity may be more susceptible to fluctuation, even with environmental conditions constant.

In other examples of controlled incubation bacteriological species manifest more nearly constant rates of development. In those examples, goal attainment lends itself to be calculated mathematically. Under such circumstances there may be employed an incubator 31, Fig. 2, also preferably with a frontal accessibility, and contemplating a casing of heat insulation wall elements for efficiency. In this device the heater element 12 is likewise disposed at an upper level, the refrigeration coil 14 at a lower level, and an air circulator power-driven by motor 13 designed to diffuse and even out varying temperature levels.

The respective thermostats 16 and 17 which regulate the heating element 12 and refrigeration coil 14 do so over their related supervisory circuits 18 and 21 which enter a settable timing device 32. The latter may be an electrically driven series of cams whose peripheries control enabling contacts for switching between the thermostats 16 and 17. By providing peripheral adjustability respecting the cams, the cultivation cycle may be measured from the inoculation instant, following which the heater will be enabled to function and maintain a heat level for an arithmetically predetermined time interval. At the expiration of this time interval, and operating on the theory of uniformity in development growth, the bacterial cultures will be summarily switched to the supervision of thermostat 17 which will revert the temperature level to that of arrestment or dormancy.

By the use of either of the prescribed systems and plans of operation there may be developed bacterial culture growths cultivated to their optimum viability and prepared for distribution in such conditions without painstaking laboratory observations over extensive periods of time.

While the present invention has been explained and described with reference to selected examples of disclosure, it will be understood nevertheless that it is susceptible to modification and variation without departure from the essential spirit or scope thereof. Accordingly, it is not intended to be limited by the particular language employed in the foregoing specification, nor by the pictorial illustrations in the annexed drawing, except as indicated in the hereunto appended claim.

The invention claimed is:

A method of cultivating lactic acid bacterial species which comprises the steps of planting inoculation charges of lactic acid bacterial cultures in uniform quantities of fluid nutrient media, agitating the environmental atmosphere around said media quantities to provide identical environmental treatment, electrically sensing the ionization changes in the fluid media and automatically raising and lowering the temperature environment of said media to arrest or promote bacterial growth in accordance with the ionization changes in said media.

References Cited in the file of this patent

UNITED STATES PATENTS

| | | |
|---|---|---|
| 1,145,054 | Boekel et al. | July 6, 1913 |
| 1,530,833 | Keeler | Mar. 24, 1925 |
| 1,859,613 | Bailey | May 24, 1932 |
| 1,982,994 | Kellogg | Dec. 4, 1934 |
| 2,360,527 | Taggart | Oct. 17, 1944 |
| 2,464,213 | Cataldo | Mar. 15, 1949 |

OTHER REFERENCES

Fisher Scientific Co., Modern Lab. Applicances (1935), page 674.

"The Glass Electrode," 1941, by Malcolm Dole, published by John Wiley & Sons, Inc. (New York), pages 232 to 237, inclusive, relied on.

"Bacterial Chemistry and Physiology," 1946, by J. R. Porter, published by John Wiley & Sons, Inc. (New York), pages 78 and 79, relied on.